United States Patent [19]

Eff

[11] 4,114,523
[45] Sep. 19, 1978

[54] OSCILLATORY DRIVE MEANS FOR A ROTISSERIE SPIT

[75] Inventor: Christian A. Eff, Louisville, Ky.

[73] Assignee: General Electric Company, Louisville, Ky.

[21] Appl. No.: 683,685

[22] Filed: May 5, 1976

[51] Int. Cl.² .......................................... A47J 37/04
[52] U.S. Cl. .................................... 99/393; 99/340; 99/427
[58] Field of Search ............... 99/421 H, 339, 340, 99/386, 420–421, 427, 443, 376, 421, 393, 395, 397; 74/70, 415, 436, 819; 219/388 R, 388 C, 391, 392

[56] References Cited

U.S. PATENT DOCUMENTS

| | | | |
|---|---|---|---|
| 2,867,163 | 1/1959 | Bloom | 99/386 |
| 2,883,924 | 4/1959 | Koser | 99/427 |
| 3,055,288 | 9/1962 | Aaronson | 99/427 |
| 3,110,829 | 11/1963 | Sundt | 74/70 |
| 3,333,529 | 8/1967 | Wilson | 99/339 |
| 3,372,636 | 3/1968 | Marasco | 99/427 |
| 3,498,211 | 3/1970 | Atkins | 99/443 R |
| 3,633,491 | 1/1972 | Williams, Jr. et al. | 99/340 |

FOREIGN PATENT DOCUMENTS 690,962  4/1953  United Kingdom ........................ 74/70

Primary Examiner—Billy J. Wilhite
Assistant Examiner—Timothy F. Simone
Attorney, Agent, or Firm—Francis H. Boos

[57] ABSTRACT

A roasting oven having a broiling element near the top of the oven liner and a rotisserie spit adapted to be supported in an elevated position from a wire frame in a broil pan seated on an oven rack. The spit is provided with a food-supporting wire basket that is attached to the spit adjacent one side edge of the basket. The basket is positioned horizontally in the oven, closely adjacent the underside of the broiling element. One end of the spit is fitted into a chuck positioned through the back wall of the oven. The chuck is driven by an oscillatory motor-drive mechanism mounted behind the oven liner, there being a long dwell period after each short oscillating movement. Hence, the food basket is capable of being inverted by the action of a downward swinging oscillating movement through an angle of 180° so as to broil both sides of the food in the basket at a distance closely adjacent the broiling element.

5 Claims, 5 Drawing Figures

OSCILLATORY DRIVE MEANS FOR A ROTISSERIE SPIT

BACKGROUND OF THE INVENTION (1) Field of the Invention

This invention relates to a roasting or broiling oven, and particularly to one that has a rotisserie spit for supporting food to be broiled within the oven. The spit is automatically controlled to turn the food over periodically so that it does not become overcooked on one side.

(2) Description of the Prior Art

In the past, it has been the usual practice in spit roasting or charcoal broiling to impale the meat on a spit and by using fork members or skewers on the spit to prevent the meat from slipping with respect to the spit. Then, by slowly rotating the spit in the presence of a radiant heating energy source, it is possible to achieve uniform cooking of the food. The primary advantage of cooking meat on a rotisserie spit is that the meats baste in their own juices as they turn; plus, they are cooked rapidly and uniformly. It is deemed desirable to provide a special spit having an adjustable wire basket for clamping small servings of food such as hamburger patties, spareribs, chicken parts, and the like. However, in roasting many small food servings in a basket of a rotisserie spit, it is preferable to substitute for the slow, constant-speed, turning action of a standard spit, a slow, lost-motion, reversible turning action for the food basket, so the flat sides of the basket are exposed to the heat source for longer periods of time. Hence, the food is held in a fixed position for the longest period of time and then the food is quickly turned over or inverted and held for a similar long period of time. This hold-turn, hold-turn action is repeated until the food is cooked to the proper degree of doneness.

An example of such a rotisserie spit with an intermittent drive mechanism is described in the Williams/Eff Pat. No. 3,633,491, which is assigned to the present assignee. This patent shows a rotisserie spit supporting an adjustable wire basket in an elevated position, near the center of the oven cooking cavity, from a broil pan supported from an oven rack. One end of the spit fits into a chuck movably mounted through the back wall of the oven liner, and this chuck is driven by a motor-drive mechanism mounted on the rear of the oven liner. This chuck of the patent is unique in that it has an inner chuck that is rotated at a constant speed for turning the spit at a uniform rate in one direction only. The inner chuck supports an outer chuck which is capable of mating with a special spit and food basket combination so that the basket has a slow, intermittent, turning action for exposing first one side of the food to the broiling element for a given length of time and then inverting the basket for exposing the opposite side of the food in the basket to the same broiling element. The speed of broiling food from a radiant heating source is dependent on the wattage or BTU of the heating source and the distance between the heating source and the food to be cooked. For relatively thick portions of meat, it is best to space the meat away from the heating source because the meat has to be cooked for a long period of time so that the interior of the meat will be cooked sufficiently. If the thick portions of meat were positioned very close to the heating source, the outer surface of the meat would be cooked first before the interior were properly cooked, and, therefore, the exterior would be burned before the interior were properly cooked. As a corollary to this, if the meat to be cooked is thin, it should be positioned closely adjacent the heating source so that the meat would be cooked rapidly and the interior of the meat would be satisfactorily cooked at the same time the exterior were properly cooked. Such a close positioning of thin servings of food to the broiling element is not possible in the above-cited Williams/Eff patent, because in that patent it is necessary that the pivotable axis of the spit be spaced away from the broiling element by a distance greater than half of the width of the food basket so that the basket is capable of rotating within the oven through 360° without striking the broiling element.

The principal object of the present invention is to provide a roasting oven with a rotisserie spit that has an oscillatory motor-drive mechanism that is capable of supporting the rotisserie spit closely adjacent the underside of the upper broiling element and, at the same time, is capable of inverting the food-supporting basket carried by the spit so as to be able to broil both sides of the food without interference with the broiling element.

A further object of the present invention is to provide a roasting oven of the type described with an oscillatory motor-drive means so the spit will move back and forth through an angle of about 180° so that at each end of the movement of the spit the food will be positioned closely adjacent the underside of the broiling element, thereby furnishing radiant heating energy to both sides of the food being cooked, in alternate steps, so as to obtain a generally uniform broiling action.

A further object of the present invention is to provide a rotisserie spit of the class described supporting a food basket at one side of the spit so that the basket is capable of swinging from a first horizontal position down through an angle of about 180° to a second horizontal position generally in the plane of the first horizontal position.

SUMMARY OF THE INVENTION

The present invention, in accordance with one form thereof, relates to a roasting oven having a rotisserie spit supported therein for oscillatory movement. One wall of the oven supports a motor-drive mechanism that has an output shaft for coupling with one end of the spit for affording an oscillatory motion to the spit, operating through an angle of 180°. The spit is attached to an adjustable food basket adjacent one side edge of the basket so that the basket may be positioned closely adjacent the underside of the broiling element to increase the speed of broiling.

BRIEF DESCRIPTION OF THE DRAWINGS

This invention will be better understood from the following description taken in conjunction with the accompanying drawings, and its scope will be pointed out in the appended claims.

DESCRIPTION OF THE PREFERRED EMBODIMENTS

Figure 1:
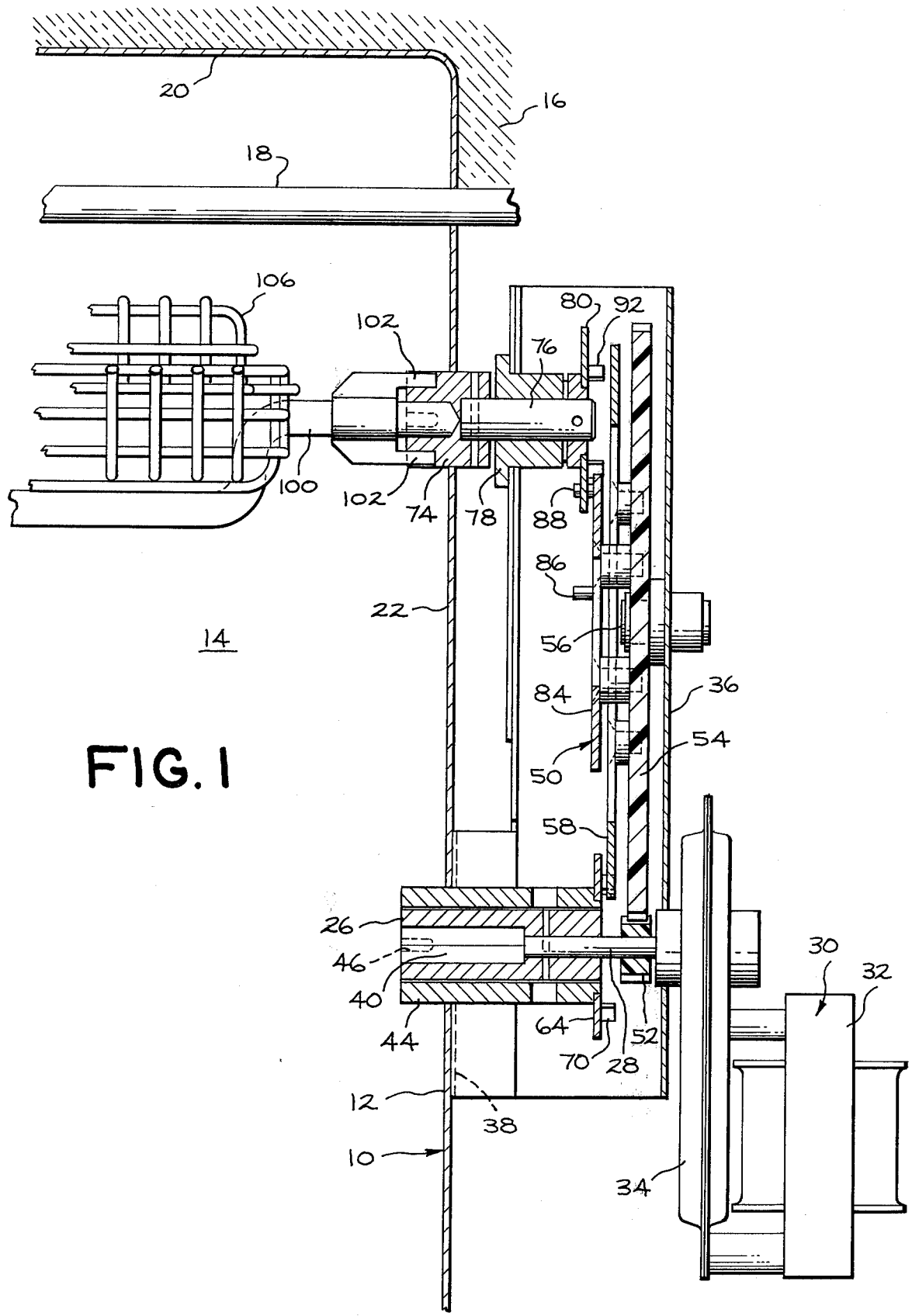
FIG. 1 is a fragmentary, side, cross-sectional, elevational view through a roasting oven showing the upper, back portion of the oven cooking cavity, an upper broiling element, a combined rotisserie spit and food basket coupled into a motor-drive mechanism mounted on the rear of the oven liner.

Turning now to a consideration of the drawings and in particular to FIG. 1, there is shown the bare outlines of a roasting oven 10 having a box-like oven liner 12 that would be furnished with an access door (not shown) for forming an oven cooking cavity 14. This oven liner is provided with thermal insulation 16 around the outside thereof, and there is an upper broiling element 18 positioned adjacent the top wall 20 of the oven liner 12. The broiling element 18 is shown as a tubular, metal-sheathed, electrical resistance heating element, but it could just as well be a gas burner serving as a source of radiant heat energy.

The present invention has been incorporated with the invention of an earlier U.S. Pat. No. 3,633,491, which was identified earlier. Hence, in order to explain the present invention, it will be necessary first to describe some of the details of the structure of the patented invention of U.S. Pat. No. 3,633,491.

In the back wall 22 of the oven liner 12 is positioned a first chuck or spit connector 26 which extends freely through an opening in the back wall for turning movement therein. This first chuck 26 is adapted to receive one end of a standard rotisserie spit (not shown) for slow, constant speed rotation in a single direction. This first chuck 26 is fixed to a first output shaft 28 of a motor-drive mechanism 30 that is mounted on the back side of the rear wall 22 of the oven liner. This motor-drive mechanism includes a synchronous gear motor 32 having a built-in, speed-reduction gear box 34 connected with the first output shaft 28 that supports the first chuck 26. Fastened to the gear box 34 is a mounting bracket 36, of generally channel shape, that has side flanges 38 which are attached to the rear wall 22 by fastening means (not shown). This first chuck 26 is provided with a hexagonal socket 40 that is adapted to receive a standard rotisserie spit having a similar hexagonal transverse cross-section. The portion of the rotisserie drive mechanism described above is generally the standard design to which has been added the invention of the prior U.S. Pat. No. 3,633,491.

A second chuck 44 is freely supported on the first chuck 26 and it has a pair of diagonal slots 46 and 46 formed in its free end. A special rotisserie spit (not shown), as taught in the patent for mating with the second chuck 44, would have a plain cylindrical rod end which is adapted to be inserted loosely into the hexagonal socket 40 of the first chuck 26. This special spit would also be provided with a pair of diagonal wings or fingers which are integral with the spit and adapted to be inserted into the diagonal slots 46 and 46 of the second chuck 44. This second chuck 44 is provided with an intermittent drive gear train 50 that drives the second chuck 44 with two lost-motion, turning actions in the same direction, having an extended holding or dwell period and a short turning action of one-half of a revolution, then another extended holding period and then another quick half turn. This is to be distinguished from the turning action of the first chuck 26 which turns at a slow, constant speed in one direction; for example, one revolution every ten seconds.

This intermittent drive mechanism 50 includes a first pinion gear 52, as seen in FIG. 1, fixed to the output shaft 28, and a large idler gear 54 meshed with the pinion gear 52. This idler gear 54 is rotatably supported on a fixed pin 56 that is riveted to the mounting plate 36. Attached to the front side of the idler gear 54 is a sector gear 58 of annular form that supports only two widely-spaced teeth 60 and 62. These teeth 60 and 62 protrude axially from the side of the sector gear 58 at the periphery thereof. Positioned on the back end of the second chuck 44 is a second pinion gear 64 that has a series of four equally-spaced, radial slots 66, each for receiving one of the teeth 60 and 62 of the sector gear 58, in the manner of a Geneva movement. Looking at FIG. 3, and assuming the sector gear 58 is turning in a counterclockwise direction, the first tooth 62 of the sector gear will make almost a complete revolution and enter the radial slot 66 of the second pinion gear 64, thereby causing the pinion gear 64 to turn in a clockwise direction through an arc of 90°. As the sector gear 58 continues to turn, the second tooth 60 will engage the next slot 66 and cause a similar clockwise movement of the pinion gear 64 through another arc of 90°, thereby giving the rotisserie spit a 180° turn. Then there will be a dwell period as the sector gear 58 makes another complete revolution before this action is repeated.

Notice a cutout 68 is formed in the sector gear 58 between the two teeth 60 and 62. This is provided to accommodate tabs 70, as best seen in FIG. 1, that are formed on the rear side of the second pinion gear 64 and serve as cam followers. These tabs 70 engage the circular periphery of the sector gear 58, which serves as a cam, to insure that the second pinion gear 64 does not get out of synchronization with the sector gear 58, and that the second pinion only turns when the teeth 60 or 62 are engaged in the slots 66 of the second pinion 64. These tabs are four in number, and they are shown in dotted lines in FIGS. 2-4.

Having described above the general nature of the intermittent drive mechanism of the prior U.S. Pat. No. 3,633,491, attention is now directed to the oscillatory drive mechanism of the present invention which relates to a third chuck or spit connector 74 which is rotatably mounted through an opening in the back wall 22 of the oven liner directly above the first two chucks 26 and 44 to be nearer the broiling element 18. This third chuck 74 is mounted on a drive shaft 76 that is rotatably supported in a bushing 78 from the mounting bracket 36. Fastened to the inner end of the shaft 76 is a third pinion gear 80, which is similar in nature to the second pinion gear 64 in that it has a series of four equally-spaced, radial slots 82. There is a second sector gear 84 fastened to the front side of the idler gear 54 to be concentric with the first sector gear 58. Thus, this second sector gear 84 and the third pinion gear 80 constitute a second Geneva movement of the motor-drive mechanism 30 of the present invention.

Figure 2:
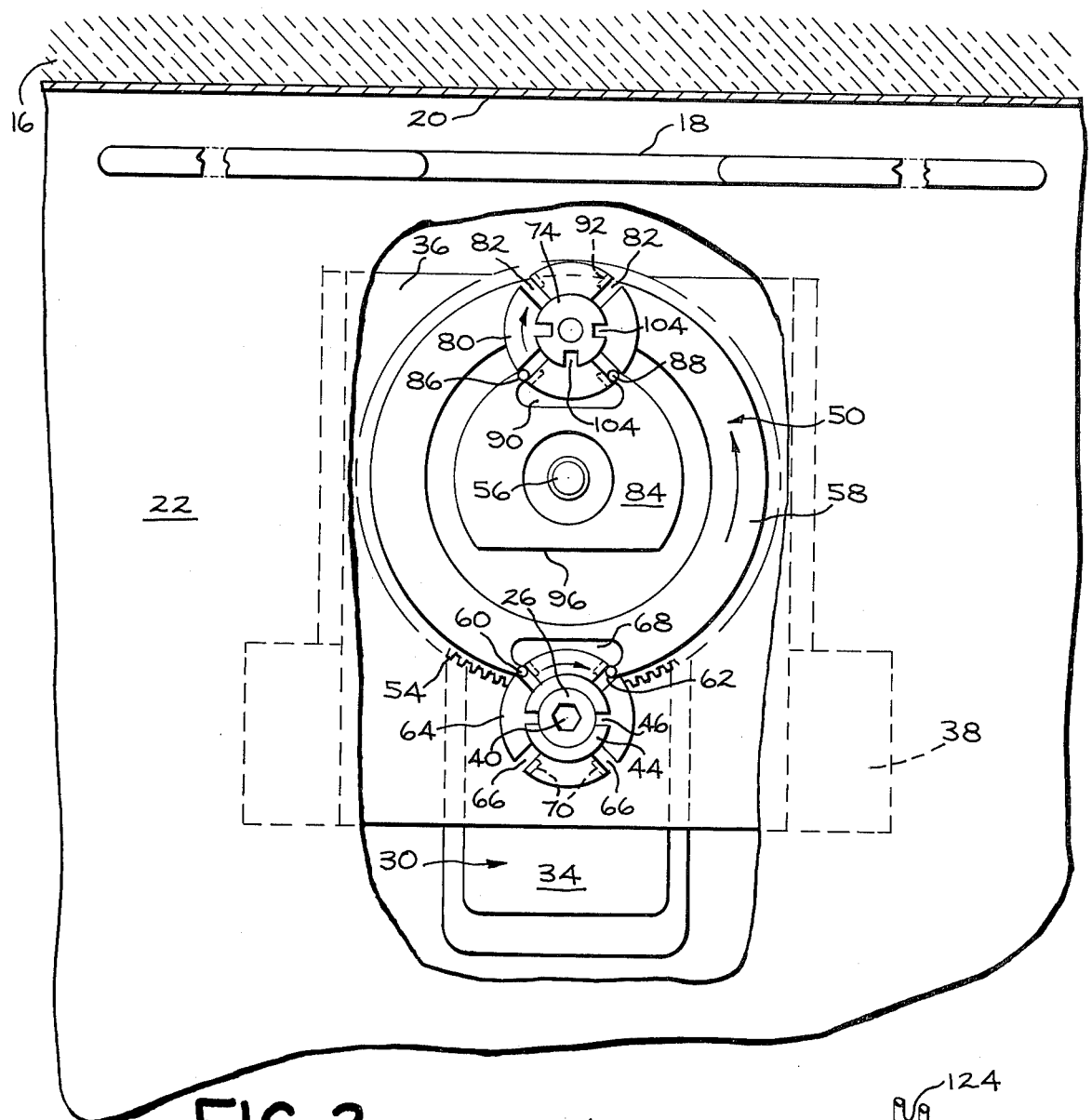
FIG. 2 is a fragmentary, front, cross-sectional, elevational view on a reduced scale looking toward the back wall of the oven liner of FIG. 1 with the combined rotisserie spit and food basket removed and part of the back wall of the oven liner broken away to show the nature of the motor-drive mechanism that provides the oscillatory action.
Figure 3:
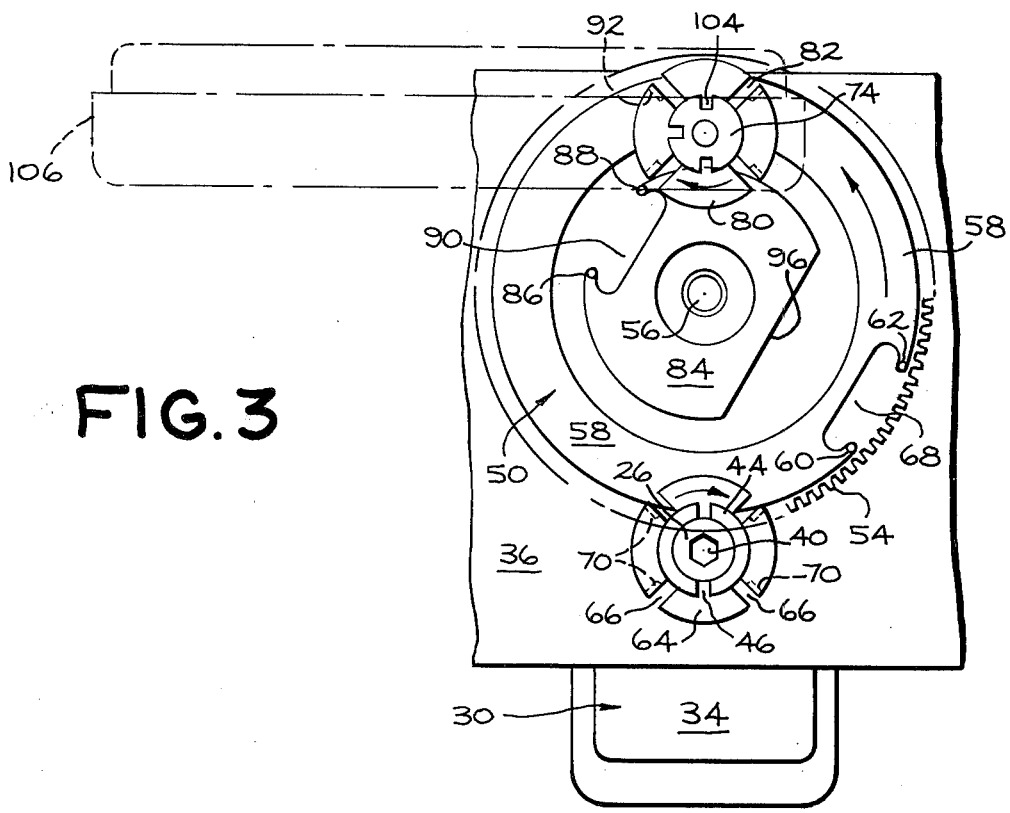
FIG. 3 is a fragmentary, front view similar to that of FIG. 2, except the food basket is shown in dotted lines in a fixed horizontal position at the left side of the oven to be closely adjacent the upper broiling element.
Figure 4:
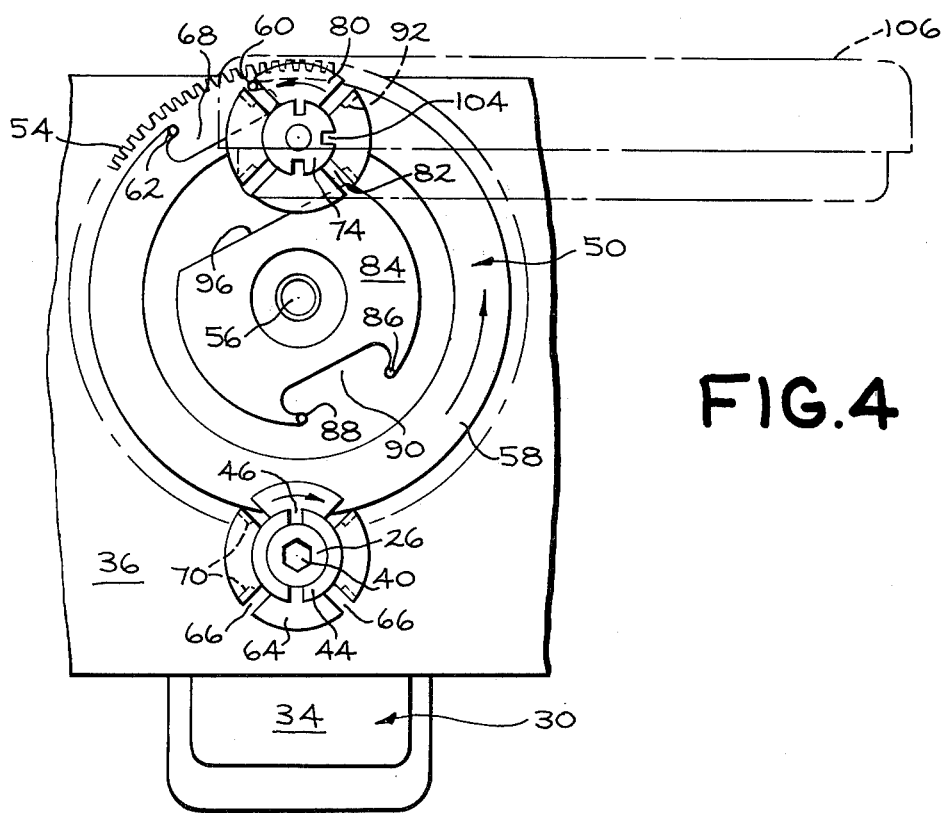
FIG. 4 is a fragmentary, front view similar to that of FIG. 3, except the motor-drive mechanism has continued to turn in a counterclockwise direction causing the Geneva gear movement to shift the rotisserie spit and its food basket in a counterclockwise direction down and around to its second horizontal position that is generally in the same plane as the first horizontal position of FIG. 3, so as to be closely adjacent to the underside of the broiling element.

As best seen in FIG. 3, this second sector gear 84 is provided with a pair of widely spaced teeth 86 and 88 which are similar in nature to the teeth 60 and 62 of the first sector gear 58. These teeth 86 and 88 are adapted to mesh with the slots 82 of the third pinion gear 80 so that when the idler gear 54 is turning in a counterclockwise direction, as seen in FIG. 2, the tooth 86 of the second sector gear 84 will engage in the slot 82 of the third pinion gear 80 and cause the third pinion gear to turn in a clockwise direction through an angle of 90°. FIG. 2 shows the tooth 86 leaving the slot 82 and the tooth 88 just entering into the slot 82. Then the second tooth 88 causes the third pinion gear 80 to move again in a clockwise direction through an angle of 90°, thereby, in effect, turning the third chuck 74 through an angle of 180° in a short period of time.

Notice in FIG. 3 that the teeth 86 and 88 of the second sector gear 84 are opposite the teeth 60 and 62 of the first sector gear 58. Thus, the second sector gear 84 causes a turning movement of about 180° in a clockwise direction of the third pinion gear 80, and then there is a dwell period for a little less than a half revolution of the idler gear 54. Then the teeth 62 and 60 of the first sector gear 58 act upon the two slots 82 in the upper half of the third pinion gear 80 that cause the third pinion gear 80 to move in a counterclockwise direction through an angle of 180° in two 90° steps. To explain, the tooth 62 will engage in the slot 82 of the third pinion gear 80 and cause the gear 80 to move counterclockwise through 90°, and then the second tooth 60 will engage in the next slot 82 and cause a movement of gear 80 another 90° in a counterclockwise direction. Thus, the second sector gear 84 causes the third chuck 74 to move in a clockwise direction, as seen in FIG. 2, through 180°, and then there is a dwell period. Then the teeth 60 and 62 of the first sector gear 58 will cause the third chuck 74 to move in a counterclockwise direction through 180°.

Notice that the second sector gear 84 also has a cutout 90 formed between the teeth 86 and 88 similar to the cutout 68 in the first sector gear 58 between the teeth 60 and 62. These cutouts 68 and 90 are provided for the same reason. Cam followers or tabs 92 are formed on the back side of the third pinion gear 80 which cooperate with the circular periphery or cam surface of the second sector gear 84 to prevent the third gear 80 from getting out of synchronization with the teeth of the second sector gear 84. There is also another cutout 96 in the second sector gear 84 that is opposite the first cutout 90, but there are no teeth associated with it, as are the teeth 86 and 88 that are associated with the cutout 90. This cutout 96 is to accommodate the movement of the cam followers or tabs 92 of the third pinion gear 80 when the teeth 60 and 62 of the first sector gear 58 are acting upon the slots 82 of the third pinion gear 80. When that happens, the third pinion gear 80 is moving counterclockwise relative to the second sector gear 84, and thus the tabs 92 must be unimpaired in their movement.

Described above is the oscillatory movement of the third chuck 74 through an angle of 180°. Now to be explained is how this oscillatory movement of 180° is used to broil food that is located closely adjacent the underside of the broil element 18. A special rotisserie spit 100 is provided for engagement in the third chuck 74. This spit has an inner end with three radial fingers 102 for mating engagement in the three slots 104 of the chuck 74, as is best seen in the front view of FIG. 2. Thus, this spit 100 can only be assembled with the chuck 74 in one angular relation, so that there can be no malfunction of the system. This spit 100 is furnished with an adjustable food-supporting wire basket 106 that is attached to the spit adjacent one side edge of the basket, as is best seen in the dotted-line position of FIG. 4. This adjustable wire basket 106 is similar in nature to the adjustable wire basket of the prior U.S. Pat. No. 3,633,491, except that the basket is mounted to one side of the spit 100 rather than having the spit go through the center of the basket as in the prior U.S. Pat. No. 3,633,491. In the prior patent, the spit was furnished with an intermittent drive, but the spit always turned in the same direction. In the present invention, the spit 100 only moves back and forth through an angle of 180° in an oscillating fashion, and it never makes a complete revolution. Thus, when comparing FIGS. 3 and 4 of the drawings, in FIG. 3, the basket 106 is in a first horizontal position, generally parallel to the underside of the upper broiling element 18. The basket is shown on the left side of the spit 100 and its chuck 74. Now, in FIG. 4, the basket 106 has swung down and over to its second horizontal position at the right side of the oven to be in a horizontal position that is generally in the same plane as the basket in the first horizontal position of FIG. 3. To repeat, in the first horizontal position of FIG. 3, the basket 106 is in the left side of the oven, while, in the second horizontal position of FIG. 4, the basket 106 is in the right side of the oven. It is well to have the broiling element 18 cover an area that is substantially twice the area of the basket 106 so that there is proper amount of radiant heat energy supplied to the food clamped within the wire basket 106 so as to broil both sides of the food uniformly without causing overheating or underheating. The wire basket is an adjustable, hinged apparatus that can be opened for loading the hamburger patties, chicken parts, and the like within the basket, and then the basket is clamped shut so that it cannot open inadvertently.

Figure 5:
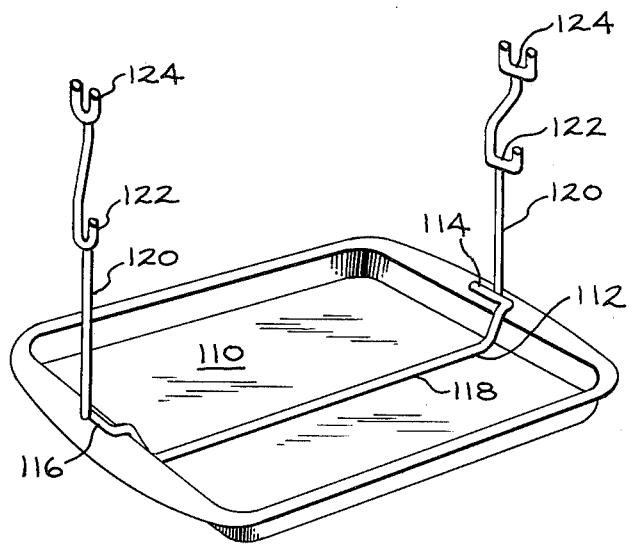
FIG. 5 is a perspective view of a broil pan supporting a wire frame that has a pair of widely spaced vertical posts to serve as the support means for the combined rotisserie spit and food basket of the present invention.

FIG. 5 shows a broil pan 110 that is provided with a wire frame 112 to serve as a support means for the rotisserie spit 100. This pan would be supported on an oven rack (not shown). This wire frame 112 has end portions 114 and 116 which overlie the opposite flanges of the pan 110 and are locked therein by means of a pin and slot connection, as is well known. These end portions 114 and 116 are joined together by a connecting bar 118 that bears against the bottom of the pan 110 and serves to stabilize the frame. Rising from the end portions 114 and 116 are a pair of posts 120 that are each provided with a series of vertically spaced bearings 122 and 124. The top bearings 124 are for receiving the special rotisserie spit 100 of the present invention for holding the wire basket 106 in an elevated position closely adjacent the underside of the broiling element 18 so that the spit may be coupled with the third chuck 74. The lower pair of bearings 122 are for either receiving a standard rotisserie spit for fitting into the constant speed, first chuck 26 or for receiving the special rotisserie spit of the prior U.S. Pat. No. 3,633,491 for fitting into the second chuck 44 to given an intermittent drive to the wire basket supported on the special spit.

Modifications of this invention will occur to those skilled in this art; therefore, it is to be understood that this invention is not limited to the particular embodiments disclosed, but that it is intended to cover all modifications which are within the true spirit and scope of this invention as claimed.

What is claimed as new and desired to be secured by Letters Patent of the United States is:

1. A roasting oven comprising walls defining an oven cooking cavity, radiant heating means located adjacent the top wall of the oven cooking cavity, removable support means within the oven, a pair of spaced posts attached to the support means, a rotisserie spit supported adjacent its opposite ends from the said posts for pivotal movement with respect thereto, one vertical wall of the oven cooking cavity supporting a motor-drive mechanism having a chuck disposed closely adjacent the underside of the radiant heating means and adapted to be coupled with one end of the spit, said motor-drive mechanism having means causing the chuck to oscillate approximately 180°, a food-supporting basket fixed to the spit adjacent one side edge of the basket, the distance between said spit when coupled with said chuck and said underside of said radiant heating means being less than the radial distance from said spit to the side edge of said basket most remote from said spit, said basket being capable of swinging back and forth from a first horizontal position closely adjacent a portion of the radiant heating means, down and over to a second horizontal position closely adjacent another portion of said heating means so as to be able to broil both sides of the food supported in the basket in alternate steps until the food is cooked.

2. A roasting oven as recited in claim 1 wherein the said motor-drive mechanism has a dwell period after each oscillating movement of the chuck so as to tend to broil the food uniformly on the opposite sides thereof.

3. A roasting oven as recited in claim 1 wherein the said radiant heating means is of a planar size that is about twice the planar area of the basket of the rotisserie spit so that the food may be exposed directly to the radiant energy of the heating means.

4. A roasting oven as recited in claim 1 wherein the said motor-drive mechanism comprises a mounting means supporting an electric motor that is provided with a speed reducing gear train that has an output shaft supporting a first pinion gear, a large idler gear meshing with the said first gear, a second shaft supported from the said mounting means and fitted with the said chuck for mating with the rotisserie spit, a Geneva gear movement interposed between the said idler gear and the said second shaft, said Geneva gear movement comprising a second pinion gear fixed to the second shaft and having a series of four equally spaced radial slots; associated with this second pinion gear are a pair of concentric sector gears fastened to the side of the said idler gear, each sector gear comprising a pair of spaced teeth, the teeth of one sector gear being located on the side opposite the teeth of the other sector gear, the pair of spaced teeth of the innermost sector gear being adapted to mesh with the two radial slots in the lower half of the second pinion gear for turning the second pinion gear in one direction in two 90° increments, while the pair of spaced teeth of the outermost sector gear are adapted to mesh with the two radial slots in the upper half of the second pinion gear for turning the second pinion gear in the opposite direction in two opposite 90° increments, there being a dwell period when the teeth of the sector gears are free from the radial slots of the second pinion gear for a period of slightly less than one-half of a revolution of the idler gear.

5. A roasting oven as recited in claim 1 wherein the said motor-drive mechanism includes a shaft for the said chuck that is adapted to be coupled with the rotisserie spit, said shaft being provided with a Geneva gear movement for causing the chuck to oscillate between about 180°, said Geneva gear movement having a pinion gear fixed to the said shaft with a series of four spaced radial slots, said pinion gear cooperating with a pair of concentric sector gears that are carried by an idler gear that is in turn driven by a speed reducing gear train of the motor-drive mechanism, the innermost sector gear having a pair of spaced teeth for engaging the two radial slots in the lower half of the pinion gear for turning the pinion gear in one direction in two 90° increments, while the outermost sector gear has a pair of spaced teeth for engaging the two radial slots in the upper half of the pinion gear for turning the pinion gear in the other direction in two 90° increments, and means to prevent the slots of the pinion gear from getting out of synchronization with the teeth of the two sector gears.

* * * * *